(12) United States Patent
Glass et al.

(10) Patent No.: US 6,561,275 B2
(45) Date of Patent: May 13, 2003

(54) APPARATUS FOR CONTROLLING FLUID FLOW IN A CONDUIT WALL

(75) Inventors: S. Jill Glass, Albuquerque, NM (US); Scott D. Nicolaysen, Albuquerque, NM (US); Edwin K. Beauchamp, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 101 days.

(21) Appl. No.: 10/146,533

(22) Filed: May 14, 2002

(65) Prior Publication Data

US 2002/0136904 A1 Sep. 26, 2002

Related U.S. Application Data

(62) Division of application No. 09/697,231, filed on Oct. 26, 2000.

(51) Int. Cl.$^7$ .......................... E21B 33/00; E21B 17/00
(52) U.S. Cl. ................ 166/317; 166/242.1; 166/376
(58) Field of Search ................................ 166/317, 376, 166/242.1

(56) References Cited

U.S. PATENT DOCUMENTS

| | | | | |
|---|---|---|---|---|
| 4,813,481 A | * | 3/1989 | Sproul et al. | 137/527.8 |
| 5,188,182 A | * | 2/1993 | Echols et al. | 166/325 |
| 6,397,950 B1 | * | 6/2002 | Streich et al. | 166/177.2 |

* cited by examiner

*Primary Examiner*—Deborah Jones
*Assistant Examiner*—G. Blackwell-Rudasill
(74) *Attorney, Agent, or Firm*—Elmer A. Klavetter

(57) ABSTRACT

A frangible rupture disk and mounting apparatus for use in blocking fluid flow, generally in a fluid conducting conduit such as a well casing, a well tubing string or other conduits within subterranean boreholes. The disk can also be utilized in above-surface pipes or tanks where temporary and controllable fluid blockage is required. The frangible rupture disk is made from a pre-stressed glass with controllable rupture properties wherein the strength distribution has a standard deviation less than approximately 5% from the mean strength. The frangible rupture disk has controllable operating pressures and rupture pressures.

7 Claims, 5 Drawing Sheets

APPARATUS FOR CONTROLLING FLUID FLOW IN A CONDUIT WALL

This application is a divisional application of U.S. patent application Ser. No. 09/697,231, filed on Oct. 26, 2000, which is herein incorporated by reference in its entirety.

This invention was made with Government support under Contract No. DE-AC04-94AL85000 awarded by the Department of Energy. The Government has certain rights in the invention.

BACKGROUND OF THE INVENTION

The invention relates to a glass rupture disk and, more particularly, to a glass rupture disk and mounting apparatus with controllable rupture characteristics positioned to selectively restrict fluid flow in a well.

In the general process for drilling and production of oil and gas wells, at that point in the process where a hydrocarbon formation has been located at a particular depth, normally an exterior casing would be lowered down the bore hole through the area of production, known as the production zone. The exterior casing is perforated with the use of a perforating gun or the like. Using electric wire line and setting tools, or some other means, a permanent type packer, referred to as a "sump packer" is usually set below the perforations. Subsequently, an internal tubing string, together with sand screen and blank pipe, packer and packer extension, hydraulic setting tool, cross-over tool, and wash pipe, are positioned within the exterior casing to engage with the "sump packer". The annulus between the sand screen and the exterior perforated casing is packed off, utilizing certain procedures. This packing off is necessary so that the interior tubing would be utilized to carry the recovered hydrocarbons to the surface. The area around the perforations is prepared, so that the flow of hydrocarbons can commence.

After gravel packing is complete,. oftentimes the well can not necessarily be pressure balanced. The formation, under these conditions, can tend to absorb the well fluid into the production zone or the fluid in the zone can tend to flow into the well. In either case, this could lead to unacceptable (a) loss of expensive well fluid, (b) damage to the formation, (c) danger of a potential well blow-out or comingling of formation fluids. There is a need in the art for a device, such as a valve or rupture disk, that can prevent the movement of fluids within the well and under varying degrees of pressure differential within the well.

In conventional practice, when a well conduit is desired to be temporarily closed off, it is common to set a plug within the conduit to preclude the flow of fluids at the preferred location. Alternatively, a temporary plug can be installed in the lower end of the production tubing to permit tests for the pressure bearing integrity of the tubing. Additionally, the plug can permit the selective pressurization of the tubing to permit the operation of pressure sensitive tools within the tubing. Regarding oil and gas wells, there are many types of plugs that are used for different applications. As an example, there are known removable plugs typically used during cementing procedures that are made of soft metals that may be drilled out of the conduit after use. Plugs that can be removed from a well intact are referred to as "retrievable" plugs. Removal, however, requires mechanical intervention from the surface of the well. Common intervention techniques include re-entry into the well with wireline, coiled tubing, or tubing string. Because other well operations cannot be performed during such work, the retrieval of the temporary plug delays the well operations and adds additional-cost to the well operations.

After a conventional type plug has been set and it subsequently becomes necessary to reestablish flow, any tools that have been associated with the plug during its use must be removed or "pulled" from the well to provide access to the plug for the removal process. The pulling of tools and removal of the plug to reestablish flow within a downhole conduit often entails significant cost and rig downtime. It is, therefore, desirable to develop a plug that can be readily removed or destroyed without either significant expense or rig downtime.

Known conduit plugs incorporating frangible elements that must be broken from their plugging positions include frangible disks that are stationarily located within tubular housings and flapper type elements. One technique uses a phenolic disk packed with explosives. Breakage can be initiated by piercing the plug to cause destructive stresses within the plug's body, mechanically impacting and shattering the plug, or increasing the pressure differential across the plug until the plug is "blown" from its seat. After breakage has occurred, the resulting shards or pieces must be washed out of the well bore with completion fluid or the like in many situations. Because most known designs call for a relatively flat plug to be supported about its periphery, the plug commonly breaks from the interior outwardly and into relatively large pieces that can interfere with other well completion activities.

Another temporary plug technique uses a glass disk to temporarily seal the well tubing. When ruptured with fluid pressure, explosives, or mechanical devices, the glass fractures into relatively small fragments to open the tubing bore. Although the glass fragments are generally smaller than the fragments left by a phenolic disk, the glass disks are brittle and do not reliably support large differential fluid pressures within the well. The glass surfaces are also easily damaged leading to significant strength degradation of the glass. As a result, the glass disks can inadvertently rupture, leading to failure of the completion operations.

DESCRIPTION OF SPECIFIC EMBODIMENTS

According to the present invention, a frangible rupture disk is provided for use in blocking fluid flow, generally in a fluid conducting conduit such as a well casing, a well tubing string or other conduits within subterranean boreholes. The disk can also be utilized in above-surface pipes or tanks where temporary and controllable fluid blockage is required. The frangible rupture disk is made from a pre-stressed glass with controllable rupture properties wherein the strength distribution, as measured by biaxial flexure tests using ring-on-ring loading (D. K. Shetty, A. R. Rosenfield, P. McGuire, G. K. Bansal, and W. H. Duckworth, J. Am.

Ceram. Soc., 1980, 59,12, 1193–97; incorporated herein by reference), has a standard deviation less than approximately 5% from the mean strength. Standard pre-stressed and annealed glasses have strength distributions with large standard deviations (generally about 20%); if these glasses were used in rupture disks, it would generally result in rupture disks that can fail at fluid pressures lower than the desired failure pressure and can survive at pressures above the desired failure pressure. In a typical application using the rupture disk of the present invention, a frangible rupture disk is provided wherein the well casing or pipe can operate reliably at a specified operating pressure (for example, about 2000 psi), preventing fluid flow between the external environment and the internal pipe or well casing environment. The rupture disk can be designed to reliably rupture at a pressure at least 5% higher than the operating pressure (for example, approximately 2500 psi). Multiple rupture disks can be utilized in such a pipe or well casing.

The glass used in the glass rupture disk of the present invention is a glass that is pre-stressed using a double ion-exchange process that produces a stress profile with the maximum in the compressive stress below the surface of the glass, rather than at the surface. As a result, the strength distribution is narrow, producing a standard deviation for the glass strength less than approximately 5% of the mean strength. As characterized by the Weibull modulus for the strength distribution, the glass has shown Weibull moduli in the range of 60, compared with standard glasses and ceramics with Weibull moduli in the range of 5–15. (The Weibull modulus defines the strength data scatter of a given volume of ceramic under a uniform stress.) The narrow strength distribution is important in allowing the disk of the present invention to function reliably. Glasses with low Weibull moduli are unreliable in controllably blocking fluid flow as they can unexpectedly fragment at the operating pressures rather than the designed rupture pressure, or survive at pressures well above the specified failure pressure. For the glass rupture disks of the present invention, a Weibull modulus of greater than approximately 25 is required.

Figure 1:
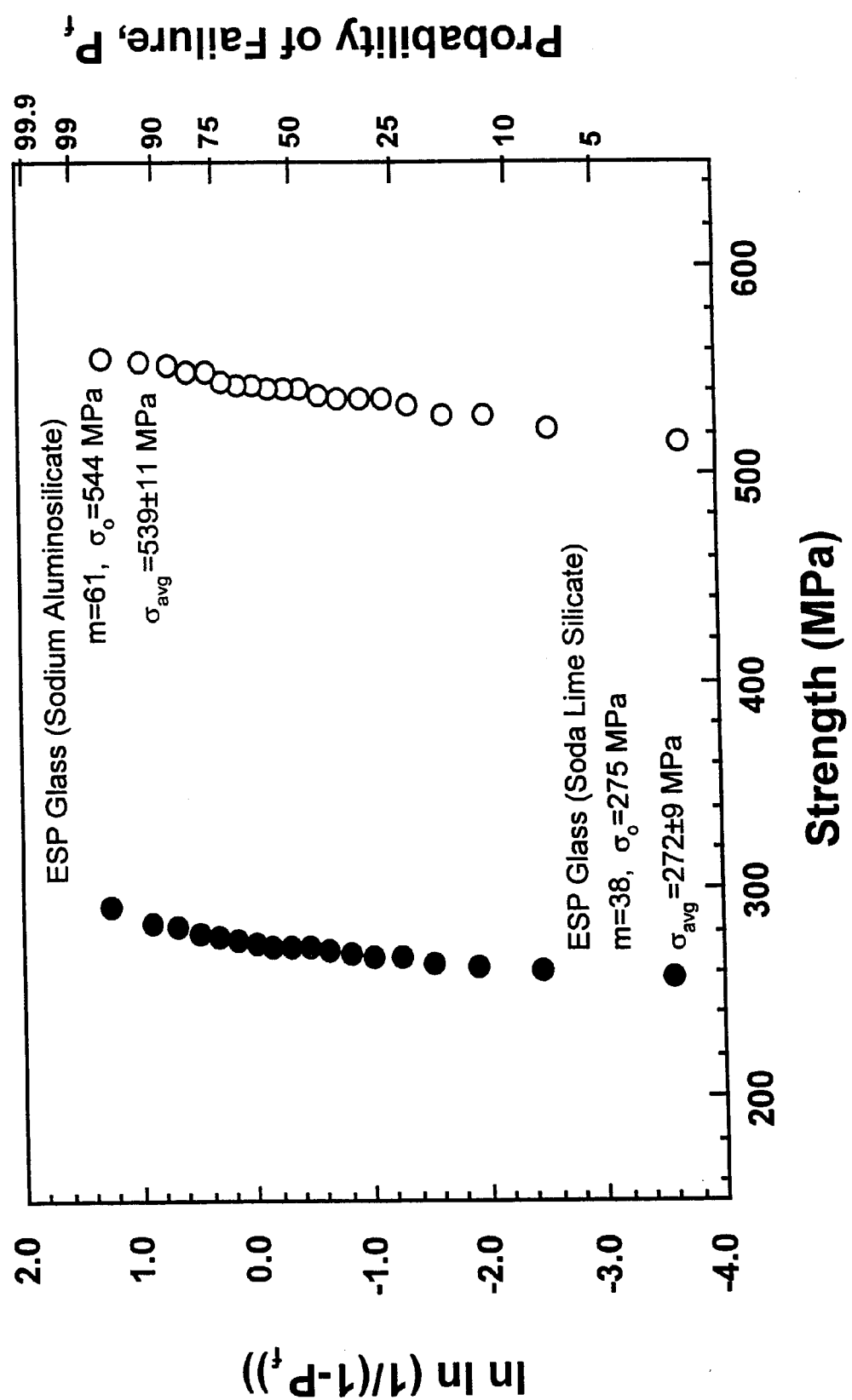
FIG. 1 shows the strength distribution and probability of failure for two different glass formulations with high Weibull moduli (m).
Figure 2:
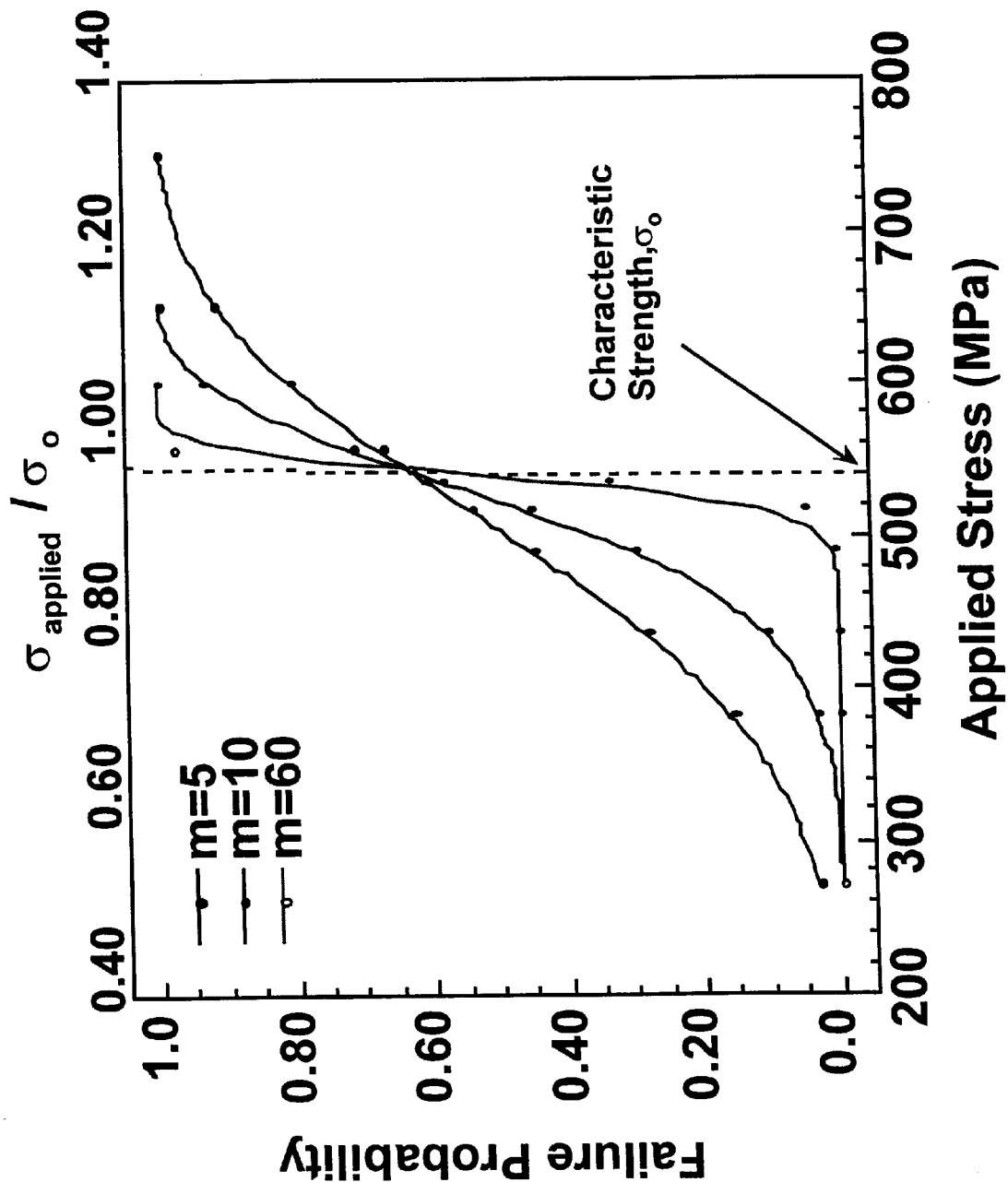
FIG. 2 shows the effect of Weibull modulus of glasses with similar strengths on failure probability.

One of the glasses used in the glass rupture disk of the present invention is a sodium aluminosilicate glass where sodium ions are replaced by potassium ions using normal ion exchange procedures. Some of the potassium ions are exchanged back to sodium near the surface to produce a compressive stress profile below the surface that results in a crack arrest phenomenon. Glass compositions, comprised of approximately (by weight percent) 62–73% $SiO_2$, 12–15% $Na_2O$, 0.3–10% CaO, 0–3% MgO, 0–4% $K_2O$, 0–17% $Al_2O_3$, 0–0.7% $TiO_2$, 0.0.2% $Fe_2O_3$, and 0–0.04% $SnO_2$ were used to develop the glass rupture disks of the present invention. The glass composition chosen was first annealed in air, for example at 560° C. for several hours, and then subjected to the first ion exchange with potassium (for example, using $KNO_3$) at elevated temperature (for example, at 500° C.) and then subjected to the second ion exchange in a potassium/sodium mixture (for example, $KNO_3/NaNO_3$), again at an elevated temperature (for example, at 400° C.). One glass composition, comprised of approximately (by weight percent) 62% $SiO_2$, 13% $Na_2O$, 0.3% CaO, 3% MgO, 4% $K_2O$, 16% $Al_2O_3$, 0.7% $TiO_2$, 0.2% $Fe_2O_3$, and 0.04% $SnO_2$, when treated by the above-described double-exchange process, produced a characteristic (mean) strength of 540 MPa with a strength distribution as shown in FIG. 1, where this composition has a Weibull modulus of approximately 60. FIG. 2 shows the strength distribution for this glass and two other glasses with the same characteristic strength, but with lower Weibull modulus values of 5 and 10. This figure demonstrates how the glass of the present invention (Weibull modulus=60) can be used to operate reliably (less than 0.05 probability of failure) at a pressure less than approximately 500 MPa and be used to rupture reliably (greater than 0.95 probability of failure) at a pressure of greater than approximately 580 MPa.

One commercial soda lime silicate glass composition effectively used to produce the narrow strength distribution required by the method of the present invention was (in approximate weight percent), 73% $SiO_2$, 15% $Na_2O$, 10% CaO, and 2% trace elements. This particular composition produced a characteristic strength of 275 MPa with a strength distribution as shown in FIG. 1, where this composition has a Weibull modulus of approximately 40.

The glass rupture disk of the present invention can be of various sizes, geometries and thicknesses. Typical is a circular disk with a thickness ranging from approximately 0.070 inches to 0.125 inches and a diameter ranging from approximately 0.5 to 1.5 inches.

For use in a fluid flow conduit, such as a pipe or well casing, the rupture disk must be situated in the wall of the conduit and therefore must be mounted and sealed in the conduit as part of a apparatus that can be inserted into the conduit wall. The conduit will have an opening, generally circular, with cross-sectional dimension small than the dimension of the glass rupture disk. The glass rupture disk will be part of an apparatus that is mounted into the opening, providing stability to the glass rupture disk to be situated such that the rupture disk provides a barrier between the internal environment of the conduit and the external environment. The apparatus also provides a seal such that the strength of the seal is greater than the rupture pressure of the glass rupture disk. Because the conduit can be bent during use, the apparatus holding the glass rupture disk must be capable of withstanding the stresses that occur during conduit bending and must not put excessive stresses on the glass rupture disk that would cause it to rupture.

Figure 3:
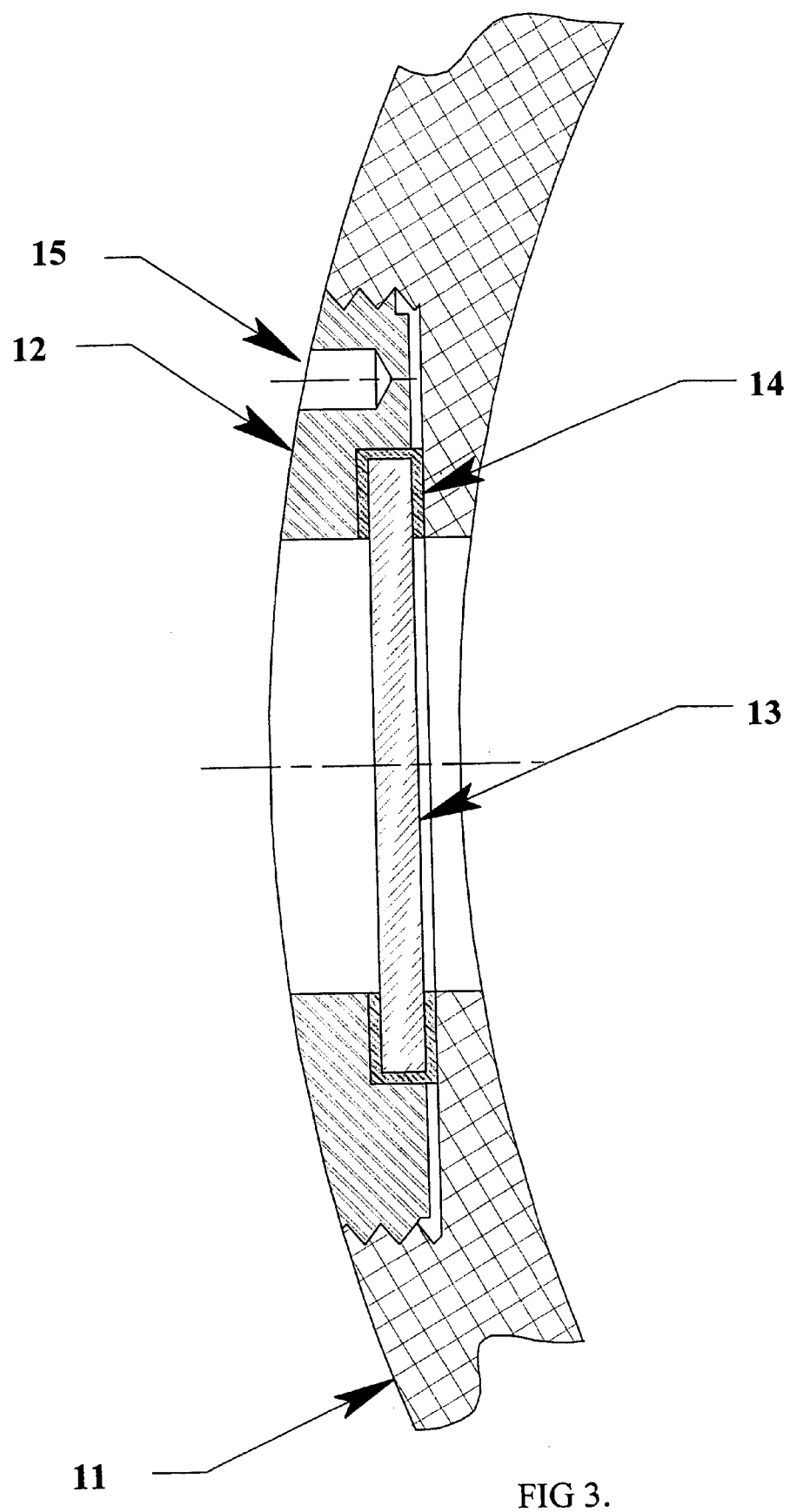
FIG. 3 shows an illustration of the apparatus of the present invention.

In one embodiment, the conduit is a cylinder where the apparatus holding the glass rupture disk is a threaded nut with a cavity to hold the glass rupture disk, with a gasket that serves to both seal the disk in the conduit but also isolates the disk from bending loads on the conduit, such as can occur when a pipe is inserted into a well bore. FIG. 3 shows an illustration of the apparatus where the glass rupture disk diameter is from 0.5–1.0 inches, the disk thickness is approximately 0.125 inches, and the conduit wall thickness is between approximately 0.25–0.5 inches. The apparatus is a threaded nut 12 with a cylindrical cross-section that can be threaded into a pre-threaded conduit wall 11, where the glass rupture disk 13 is positioned between the threaded nut and some portion of the conduit wall, thereby blocking fluid flow between the interior of the conduit and the exterior environment, with a gasket 14 positioned between the glass rupture disk and conduit wall to aid in sealing. The threaded nut 12 must seal the glass rupture disk 13 to the conduit wall sufficient to block fluid flow such that the apparatus can not be dislodged by pressure within the interior of the conduit at pressures less than the glass rupture pressure. This sealing can be accomplished by a clamping means on the exterior of the conduit, by adhesive means between the apparatus and the conduit or by threaded screws that connect the apparatus to the conduit that can be tightened to a determined torque to achieve an adequate seal for the desired operating and glass rupture pressure. FIG. 3 shows an apparatus with multiple holes 15 around the periphery where these threaded screws can connect the apparatus to the conduit.

EXAMPLE

Figure 4:
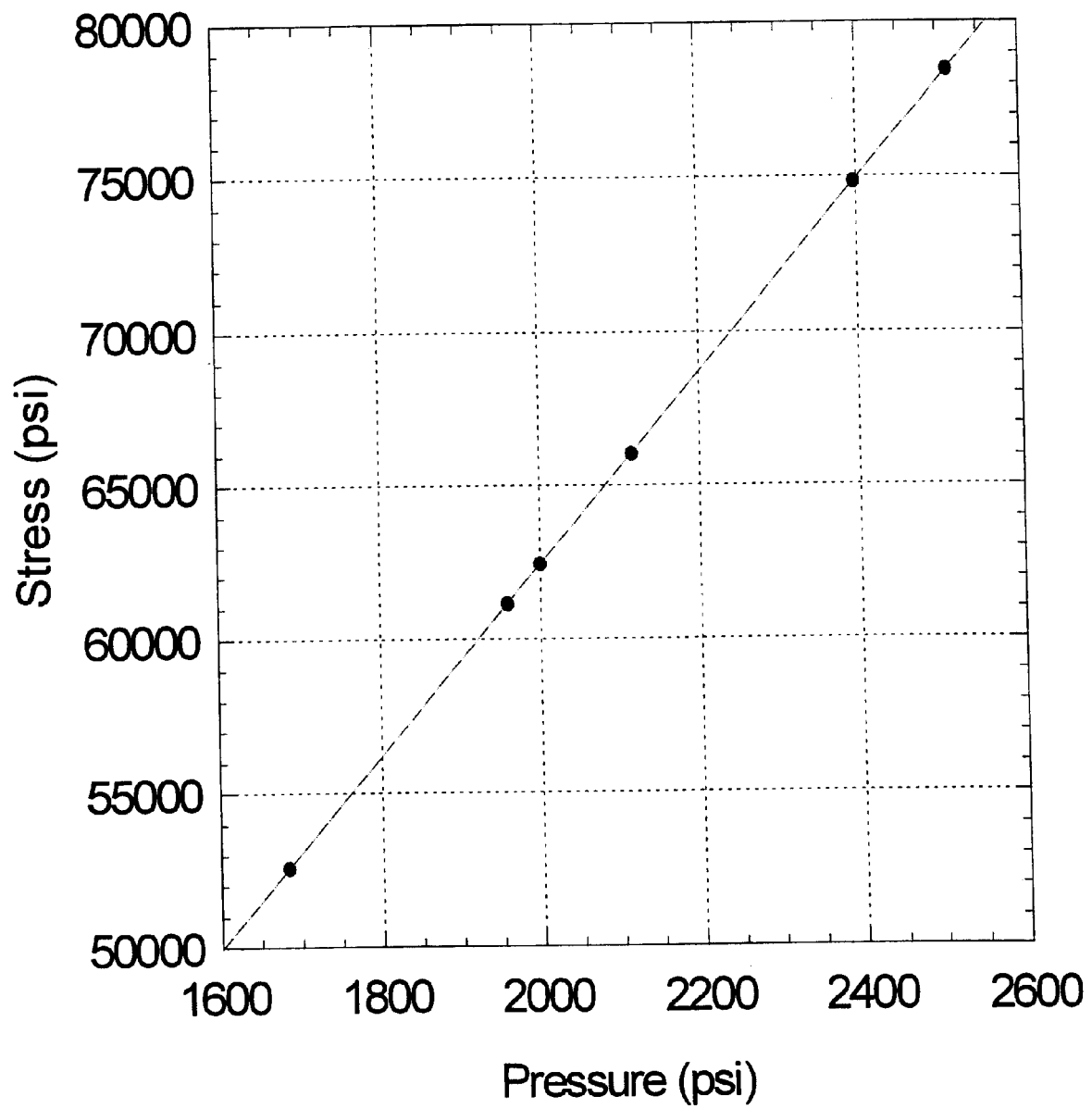
FIG. 4 shows the relationship between applied stress and operating/failure pressure for one embodiment.

A sodium aluminosilicate glass was obtained with the approximate composition (in approximate weight percent), 62.3 $SiO_2$, 12.8 $Na_2O$, 0.3 CaO, 3.3 MgO, 3.5 $K_2O$, 16.4 $Al_2O_3$, 0.7 $TiO_2$, 0.2 $Fe_2O_3$, and 0.04 $SnO_2$. Circular glass rupture disks with diameters of approximately 0.5–1.0 inches were prepared. The thicknesses were approximately 0.07 inches. This particular composition produced a characteristic strength of 539 MPa and strength distribution as shown in FIG. 1. FIG. 4 shows the relationship between the strength distribution of the glass as measured by the standard ring-on-ring loading method and the corresponding characteristic pressure when the glass is utilized in the apparatus of the present invention at the specified diameter and thickness. Variation of the thickness and diameter of the disks result in different characteristic strengths, so that the disk failure pressure and operating pressure can be controlled by varying these geometric characteristics. This glass was first annealed in air, for example at 560° C. for several hours, and then subjected to the first ion exchange with potassium (using $KNO_3$) at 500° C. and then subjected to the second ion exchange in a potassium/sodium mixture ($KNO_3$/$NaNO_3$), at 400° C. These treatments produced glass rupture disks with a glass rupture pressure of approximately 2100 psi and were designed to operate up to pressures of approximately 1700 psi.

Figure 5:
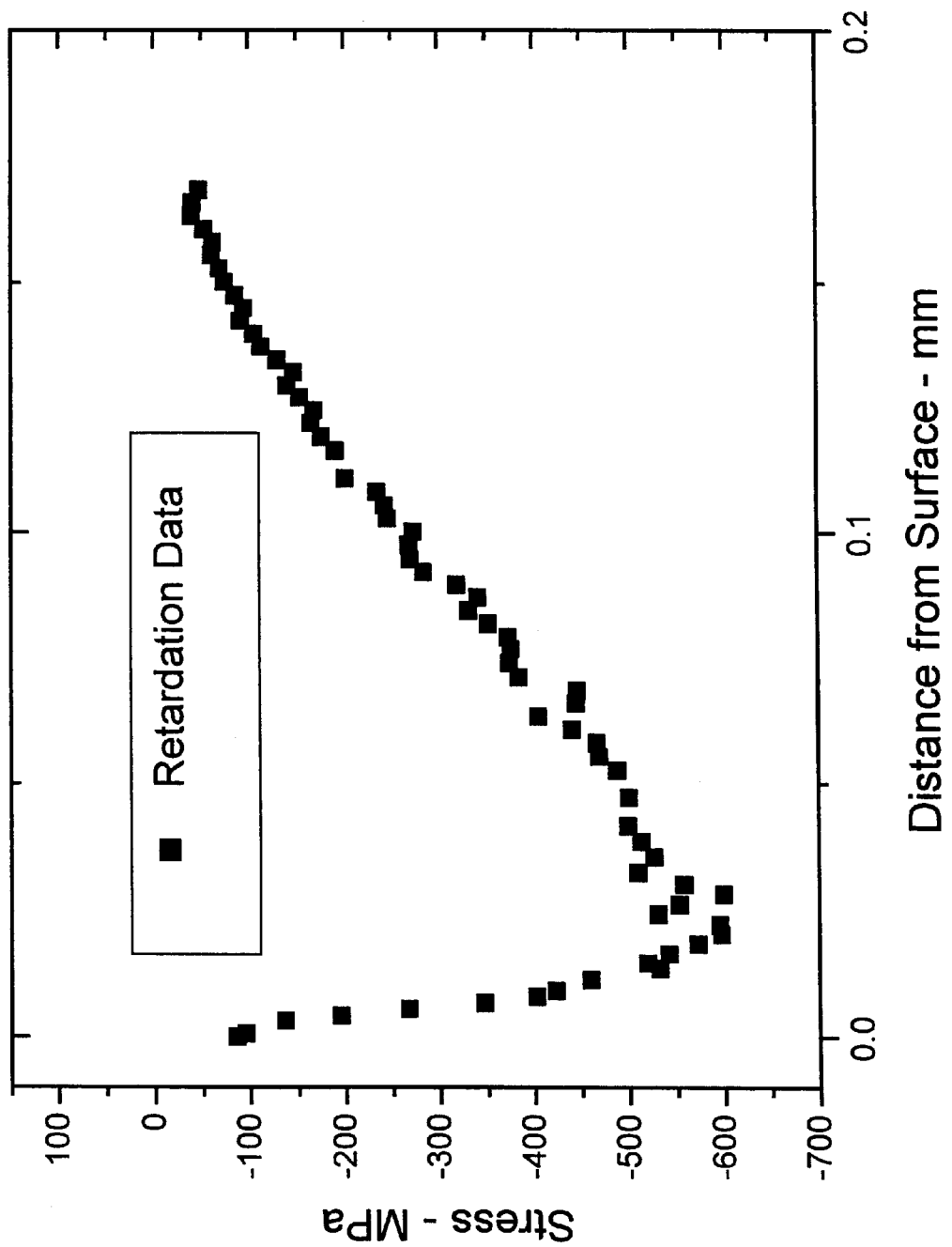
FIG. 5 shows an example of a stress profile for the glass rupture disk.

Stress profiles were measured in ion-exchanged glass disks by measuring the birefringence associated with the central tension (Bradshaw, W., J. of Material Sci., 1979, 14, 2981–2988; incorporated herein by reference). The stress profile was measured using the changes in the tensile stress at the midplane of a disk as layers of the disk were removed by etching in hydrofluoric acid. The tensile stress was determined by measuring the stress birefringence (optical retardation). FIG. 5 shows an example of a stress profile for the glass rupture disk using the stated glass composition formulation, showing that the maximum compressive stress occurs below the surface of the glass rupture disk.

Mechanical strength distributions were measured using biaxial flexure tests on cylindrical disks with ring-on-ring loading. Samples were tested with nominal thicknesses ranging from approximately 0.07 inches to 0.125 inches. The Weibull plots (FIG. 1) demonstrate that the method of pre-stressing the glass compositions tested using the double ion-exchange method produces glasses with narrow strength distributions. FIG. 1 shows typical strength distributions for two of the glasses used in the present invention. For a varying group of glasses that can be used in the glass rupture disk of the present invention, the Weibull moduli ranged from 25 to greater than 60 for varying stress rates and disk thicknesses.

When the disks ruptured, the mass of the fragments ranged from less than 0.1 g to approximately 1.2 g, with greater than 95% of the fragments (by mass) having sizes less than approximately 3.0 mm.

The glass rupture disks were placed in an apparatus as illustrated in FIG. 3 and designed for a maximum conduit bend of 12°/100 ft where the conduit has a maximum diameter of 5.5 inches and a wall thickness between approximately 0.25–0.5 inches. The threaded nut can be made of any material compatible with the fluid conduit; stainless steel can be commonly used. The gasket material must be sufficiently elastic to provide an adequate seal. A suitable material for use in oil/gas application that was used in the apparatus of the present invention was Viton® (an elastomer that is a copolymer of vinylidene fluoride and hexafluoropropylene).

The apparatus was screwed into the wall of the conduit and screws inserted in eight holes along the periphery of the nut and tightened to a torque of approximately 28 ft-lbf (38 joules), which was based on analyses that showed that this torque would produce a seal sufficient to withstand a pressure of greater than 2100 psi. The apparatus thus described withstands an operating pressure of 1700 psi and ruptures at approximately 2100 psi.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for selectively controlling fluid flow between the interior and exterior of a conduit wall, comprising:

a frangible glass rupture disk comprised of a pre-stressed glass with a strength distribution having a standard deviation less than approximately 5% from the mean strength; and mounting means sealing said frangible glass rupture disk to said conduit wall, said mounting means positioning said frangible glass rupture disk over a void space in said conduit wall to provide means to selectively control fluid flow between the interior and exterior of said conduit wall.

2. The apparatus of claim 1 wherein said mounting means comprises a threaded nut with a cavity to hold said glass rupture disk, a gasket to seal the glass rupture disk to said conduit wall, and sealing means to seal said apparatus to said wall at pressures less than and equal to the glass rupture disk failure pressure.

3. The apparatus of claim 2 wherein the sealing means is selected from a clamp, an adhesive, and at least one screw.

4. The apparatus of claim 2 wherein said sealing means is comprised of screws positioned through said threaded nut to seal said apparatus to said conduit wall.

5. The apparatus of claim 1 wherein said threaded nut is comprised of stainless steel.

6. The apparatus of claim 1 wherein said gasket is comprised of an copolymer of vinylidene fluoride and hexafluoropropylene.

7. The apparatus of claim 1 wherein said glass rupture disk has a probability of failure of less than 0.05 at operating pressures of less than approximately 1700 psi and has a probability of failure of greater than 0.95 at pressures greater than approximately 2100 psi.

* * * * *